United States Patent
Takase et al.

(10) Patent No.: US 6,504,534 B1
(45) Date of Patent: Jan. 7, 2003

(54) CRT DISPLAY UNIT AND POWER SUPPLY CONTROL METHOD THEREFOR

(75) Inventors: Katsuhisa Takase; Yuichi Komatsu; Hajime Torii; Toshihisa Tanabe; Kazuhiro Konishi; Hideo Katada, all of Ishikawa (JP)

(73) Assignee: Nanao Corporation (JP)

( * ) Notice: Subject to any disclaimer, the term of this patent is extended or adjusted under 35 U.S.C. 154(b) by 1169 days.

(21) Appl. No.: 08/712,091

(22) Filed: May 2, 1996

Related U.S. Application Data

(63) Continuation of application No. 08/431,631, filed on May 1, 1995, now abandoned, which is a continuation of application No. 08/280,145, filed on Jul. 25, 1994, now abandoned, which is a continuation of application No. 08/129,463, filed on Sep. 29, 1993, now abandoned.

(30) Foreign Application Priority Data

Sep. 29, 1992 (JP) .............................. 4-258764
Feb. 25, 1993 (JP) .............................. 5-035994

(51) Int. Cl.$^7$ ................................................ G09G 1/00
(52) U.S. Cl. ...................... 345/211; 345/10; 345/867; 348/730; 315/106; 315/107
(58) Field of Search ................................. 348/730, 377, 348/378, 634; 315/107, 106, 360, 14, 3, 175; 364/707; 345/211, 212, 213, 10, 867; 713/300, 310, 320, 321

(56) References Cited

U.S. PATENT DOCUMENTS

| | | | | |
|---|---|---|---|---|
| 1,804,526 A | * | 5/1931 | Coxhead | ..................... 455/221 |
| 3,514,532 A | | 5/1970 | Ludlam | ...................... 348/730 |
| 3,603,732 A | | 9/1971 | George | ................... 178/7.5 R |

(List continued on next page.)

FOREIGN PATENT DOCUMENTS

| | | |
|---|---|---|
| BE | 1001839 | 3/1990 |
| EP | 0099655 | 1/1984 |
| EP | 0456923 | * 11/1991 |

(List continued on next page.)

OTHER PUBLICATIONS

Edison, T.A. "The Diary and Sundry Observations of Thomas Alva Edison", Ed Runes, D.D. p. 68–79, New York 1968.*

(List continued on next page.)

*Primary Examiner*—Lun-Yi Lao
(74) *Attorney, Agent, or Firm*—Ostrolenk, Faber, Gerb & Soffen, LLP

(57) ABSTRACT

When a "screen saver" operates to display a homogeneous black picture image after the same image is continuously displayed on a CRT for a predetermined period of time, a power supply for a CRT display unit is controlled to be turned off, thereby preventing the CRT display unit from being left for a long time in a power-on state. Namely, a waiting time of 3 minutes, for example, is provided when the "screen saver" operates so that the CRT displays a homogeneous black picture image to turn off a power circuit for the CRT, and then a heater for the CRT is turned off after a lapse of a predetermined period of time of 5 to 60 minutes, for example. An extension graphics board, which is inserted in an open slot provided in a computer of an open architecture type may be provided to perform this function. The extension graphics board has an input detection part including a keyboard access detection part for detecting an address signal which is supplied to an address bus in response to manipulation of a keyboard, and an interruption request detection part for detecting an interruption signal which is output in response to manipulation of a mouse. A timer is reset when the input detection part detects the presence of an input signal received from the keyboard or the mouse. When no reset signal is supplied from the input detection part again before a lapse of a period of time which is previously set in the timer, a blank signal is supplied to the CRT display unit.

25 Claims, 7 Drawing Sheets

U.S. PATENT DOCUMENTS

| | | | | |
|---|---|---|---|---|
| 3,811,090 A | * | 5/1974 | Uchida | 358/190 |
| 3,843,929 A | * | 10/1974 | Mayle | 358/190 |
| 3,956,669 A | | 5/1976 | Del Ciello | 348/730 |
| 3,975,688 A | * | 8/1976 | Kroger | 358/190 |
| 4,553,166 A | * | 11/1985 | Sutton | 348/730 |
| 4,600,948 A | * | 7/1986 | Dangschat | 358/190 |
| 4,665,536 A | | 5/1987 | Kim | 364/707 |
| 4,722,005 A | * | 1/1988 | Ledenbach | 358/220 |
| 4,723,167 A | * | 2/1988 | Griffey | 358/190 |
| 5,059,961 A | | 10/1991 | Cheng | 345/10 |
| 5,276,458 A | * | 1/1994 | Sawdon | 345/132 |
| 5,278,654 A | * | 1/1994 | Yang | 358/190 |
| 5,335,168 A | * | 8/1994 | Walker | 364/707 |

FOREIGN PATENT DOCUMENTS

| | | | |
|---|---|---|---|
| JP | 60-1982 | | 1/1985 |
| JP | 60-165880 | * | 8/1985 |
| JP | 64-33586 | | 2/1989 |
| JP | 64-033586 | | 2/1989 |
| JP | 01257893 | * | 10/1989 |
| JP | 1-257893 | | 10/1989 |
| JP | 03-168820 | * | 7/1991 |
| JP | 60-001982 | | 1/1995 |
| WO | 9209027 | | 5/1992 |

OTHER PUBLICATIONS

Patent Abstracts of Japan, vol. 14, No. 233 (P–1049) May 17, 1990; JP–A–02 056 620 (Mita Ind. Co., Ltd.) Feb. 26, 1990 (Abstract).

IBM Technical Disclosure Bulletin vol. 34, No. 9, Feb. 1992, Armonk pp. 281–283 Anonymous "Increasing Lifetime and Reliability of CRT Displays".

* cited by examiner

CRT DISPLAY UNIT AND POWER SUPPLY CONTROL METHOD THEREFOR

This is a continuation of application Ser. No. 08/431,631, filed on May 1, 1995, now abandoned; which is continuation of application Ser. No. 08/280,145, filed on Jul. 25, 1994, now abandoned; and which is a continuation of application Ser. No. 08/129,463, filed on Sep. 29, 1993, now abandoned.

BACKGROUND OF THE INVENTION

1. Field of the Invention

The present invention relates to a CRT display unit and a power supply control method therefor, and more particularly, it relates to power supply control for extending the life of a CRT.

2. Description of the Background Art

A CRT display unit is connected to a central unit, such as a host computer, which generates a synchronizing signal and a video signal, to display an image of the video signal. In this case, it is recommended that power is applied to the CRT display unit independently of a power supply for the computer. If the power supply for the computer is also employed for applying power to the CRT display unit, this may lead to an excessive capacity of a power supply switch for the computer. Further, the CRT display unit is often installed in a position separated from the computer.

Under such circumstances, there have been proposed some CRT display units, whose power supplies are controlled to the power supplies on and off on the basis of signals from computers.

Japanese Patent Application Laying-Open No. 64-33586 (1989) describes a technique of detecting presence/absence of a video signal from a computer for on-off controlling a power supply for a CRT display unit on the basis of the result of the detection. In such a power supply control method, however, no video signal is present when a CRT intentionally displays a homogeneous black picture image, and hence the power supply for the CRT display unit is disadvantageously and erroneously turned off in this case.

On the other hand, each of Japanese Patent Application Laying-Open Nos. 60-1982 (1985) and 1-257893 (1989) describes a technique of detecting presence/absence of a synchronizing signal from a computer for on-off controlling a power supply for a CRT display unit on the basis of the result of the detection. In this power supply control method, however, the computer regularly transmits a synchronizing signal and hence, the power supply for the CRT display unit cannot be turned off unless a power supply for the computer is turned off or the CRT display unit is disconnected from the computer.

Further, there has been developed a technique of switching the screen of a CRT to display a homogeneous black image when the same display image continuously appears on the CRT for a constant period, in order to prevent burning of a fluorescent material which is applied to the screen of the CRT. Such switching of the display to a black picture image is often carried out by application software called a "screen saver", for example. When the "screen saver" operates in such a manner, however, it is difficult to distinguish the screen of the CRT from that in a cutoff state of the CRT display unit. On the other hand, the power supply for the CRT display unit is not turned off upon such operation of the "screen saver". Consequently, the CRT display unit may be left intact in an ON state of the power supply therefor. This leads to wasteful power consumption, as well as to reduction in life of the CRT because of a continuous ON state of a heater provided therein.

SUMMARY OF THE INVENTION

Accordingly, a first object of the present invention is to eliminate the aforementioned disadvantage in a CRT display unit provided with a "screen saver".

According to the present invention, as hereinafter described in detail, a power supply control method is provided for a CRT display unit which is adapted to turn off a power circuit after a lapse of a predetermined period of time, as well as, to turn off a heater after a further lapse of a predetermined period of time when a "screen saver" operates so that a CRT displays a homogeneous black picture image, in order to eliminate the aforementioned disadvantage.

However, the aforementioned "screen saver", which has been developed in order to prevent a CRT screen from burning, may be adapted to display various patterns of animations for the purpose of amusement, in addition to display of a homogeneous black picture image. A typical system of such a "screen saver" is provided with tens of types of patterns, for example, while the user can produce such patterns himself in response to his liking.

In such circumstances, an applicable range of such a power supply control method is inevitably narrowed if the factor for starting the control for turning off the power supply for the CRT display is restricted to only the display of a homogeneous black picture image. Further, the software of the "screen saver", which has dependence on an operating system, requires dedicated programs for various systems such as DOS, Windows, OS/2, UNIX and the like, for example.

When the same image is displayed on the CRT for a constant period of time and it is necessary to drive the "screen saver", all input operations for the computer which are made by an operator are interrupted. There have been proposed some devices for detecting such an interrupted state of the input operations in a hardware manner and displaying a homogeneous black picture image, for example, in order to prevent the CRT screen from burning. According to Japanese Utility Model Publication No. 2-6467 (1990), for example, a CRT display unit includes a timer so that a video signal is converted to a blank signal if no input operation is carried out for a period of time which is previously set in the timer.

In order to implement the "screen saver" in the aforementioned hardware manner, however, it is necessary to extensively modify the interior of the computer. Thus, a relatively high cost is required for such a modification. Further, such a modification is difficult to make for people other than a computer manufacturer.

Accordingly, a second object of the present invention is to implement a "screen saver" in a hardware manner, with no need for an extensive modification of a computer body.

The present invention is first directed to a CRT display unit which is adapted to be connected to a central unit which generates a synchronizing signal and a video signal, for displaying an image of the video signal on the CRT display unit. This CRT display unit includes a power supply circuit which includes a main power supply and an auxiliary power supply, a power circuit, which is driven by the main power supply, including a high voltage circuit, a deflection circuit and a video circuit, a synchronous processing circuit for processing a synchronizing signal received from the central unit and supplying the processed synchronizing signal to the high voltage circuit and the deflection circuit, a video input processing circuit, which includes a video signal detector for detecting at least one of the presence or absence of a video signal output from the central unit, for processing the video signal and supplying the processed video signal to the video circuit, and a CRT having an anode which is supplied with a high dc voltage from the high voltage circuit, a deflecting yoke which is supplied with a deflecting current from the deflection circuit, a cathode which is supplied with a cathode drive signal from the video circuit, and a heater which is supplied with a current from the auxiliary power supply. According to each of first and second aspects as described below, the CRT display unit according to the present invention preferably includes the aforementioned elements in common.

According to the first aspect of the present invention, the CRT display unit further includes a main power supply controller for controlling the main power supply to turn on or turn off the power circuit when the video signal detector detects either the presence or absence of the video signal, a first timer for timing at least a period of time when the power circuit is turned off, and auxiliary power supply controllor for controlling the auxiliary power supply to turn off the heater after a lapse of a period of time previously set in the first timer.

According to the aforementioned first aspect of the present invention, the power circuit is first turned off when the "screen saver" operates such that the CRT displays a homogeneous black picture image, i.e., when no video signal is present. When the period of time which is previously set in the first timer elapses upon continuation of such a state, the heater is then turned off. According to the present invention, therefore, it is possible to reduce wasteful power consumption, as well as to increase the life of the CRT. When a video signal is detected before the heater is turned off after turnoff of the power circuit, it is possible to quickly restore the CRT to an ordinary image display state.

In the aforementioned first aspect of the present invention, the main power supply controller preferably includes a second timer for timing the state in which no video signal is present, and a power circuit turnoff member for turning off the power circuit after a lapse of a period of time which is previously set in the second timer. In this case, the power circuit is not immediately turned off even if the "screen saver" operates so that no video signal is present, whereby it is possible to prevent the power circuit from an erroneous turn-off operation when application software intentionally displays a homogeneous black picture image, for example. Consequently, it is possible to carry out delicate power supply control.

The period of time which is previously set in the first timer is preferably rendered variable, so that it is possible to carry out power supply control in response to a requirement by an operator.

Further, the main power supply controller preferably includes a blanking signal generator which supplies a picture blanking signal to the video circuit for a prescribed period of time when the video signal detector detects the presence of the video signal. As hereinabove described, the CRT is restored to an ordinary image display state when a video signal is detected before the heater is turned off after turn-off of the power circuit, while the image is rendered abnormal at the moment of such restoration. When a picture blanking signal is supplied for a prescribed period of time of 2 seconds, for example, at the moment of restoration as hereinabove described, it is possible to avoid displaying an abnormal or irregular image.

The CRT display unit according to the second aspect of the present invention comprises a timer which starts counting when the video signal detector detects absence of the video signal for timing a state in which no video signal is present, and the power supply circuit controller for controlling the power supply circuit to turn off the power circuit and the heater after a lapse of a period of time which is previously set in the timer, in addition to the aforementioned common elements.

According to the second aspect of the present invention, it is possible to reduce wasteful power consumption while preventing the power circuit and the heater from causing erroneous turn-off operations even if the application software intentionally displays a black picture image for a relatively short period of time, as well as, to increase the life of the CRT.

In each of the first and second aspects of the present invention, the CRT display unit preferably further includes a controller for controlling the power supply circuit to turn off the power circuit and the heater after a lapse of a prescribed period of time from detection of the absence of a synchronizing signal from the central unit. In this case, it is possible to turn off the power circuit and the heater also when a power supply for the central unit such as a host computer is turned off.

According to each of the aforementioned first and second aspects of the present invention, further, the video signal detector may not detect all color signals of red, green and blue but may detect only a red or blue color signal. Such a red or blue color signal is selected as the object of detection since a green color signal may be transmitted from the central unit to the CRT display unit as a composite video signal on which a synchronizing signal is superposed, and the circuit is complicated in this case since it is necessary to eliminate the synchronizing signal from the composite video signal if the green color signal is processed as the object of detection. When only a red or blue color signal is processed as the object of detection, on the other hand, the video signal detector can be simplified in structure. Nevertheless, the video signal detector may sufficiently detect only a color signal of red or blue in order to detect the absence of a video signal. Alternatively, the video signal detector may detect both of the red and blue color signals.

The present invention is also directed to a power supply control method for the aforementioned CRT display unit.

This power supply control method includes a step of controlling the main power supply to turn off the power circuit in response to absence of the video signal, and a step of controlling the auxiliary power supply to turn off the heater after a lapse of a predetermined period of time in such an OFF state of the power circuit.

In the power supply control method according to the present invention, the main power supply and the auxiliary power supply may be so controlled as to turn off the power circuit and the heater after a lapse of a prescribed period of time which begins with a state in which absence of the video signal is detected.

According to the present invention, further, attention is drawn to a computer of an open architecture type which is manufactured by IBM Corporation, for example, in order to attain the aforementioned second object. Such a computer of an open architecture type, whose interfaces are laid open to the public, includes some option slots so that the user can insert option boards for varying the computer functions as needed. The option boards can be manufactured by a manufacturer of such boards. According to the present invention, a graphics board can be used as one of such option boards. While a graphics board originally includes a circuit for supplying a video signal to a CRT display unit in order to display a picture which is based on an input signal from an external input device such as a keyboard, for example, hardware for implementing the "screen saver" is added to such a graphics board according to the present invention.

In more concrete terms, the graphics board according to the present invention includes an input detection part for detecting at least one of the presence and the absence of an interruption request which is generated upon receipt of an input signal from the external input means for detecting presence of the input signal from the external input device, a timer starting a timing operation when the input detection part detects the presence of the input signal, and a signal supply member for supplying a blank signal to the CRT display unit as a video signal when the input detection part detects the absence of an input signal again before a lapse of a period of time previously set in the timer.

The external input decive typically includes an input operation device such as a keyboard and a mouse which are driven by the operator, as well as those based on an external communication system such as a network, a facsimile, a digitizer and a track ball.

When the external input device is formed by a keyboard, the input detector detects an address signal which is supplied as an output to an address bus in response to manipulation of the keyboard. When the external input device is formed by a mouse, on the other hand, the input detection part detects an interruption signal which is supplied as an output in response to manipulation of the mouse.

When such an external input device is formed by a plurality of elements such as a keyboard, a mouse and another external unit, the timer preferably starts its timing operation when the input detection part detects the presence of an input signal from any one of the external input devices. Further, the input detection part is preferably adapted to select the external input device that is generating an input signal whose presence is to be detected.

Thus, the present invention is further provided with a function of the "screen saver", which supplies a blank signal to the CRT display unit as a video signal when no input signal is received from the external input device for a prescribed period of time, with respect to an extension graphics board which is inserted in an option slot provided in a computer of an open architecture type.

Thus, according to the inventive graphics board, it is possible to provide a computer of an open architecture type with a "screen saver" function simply by inserting the graphics board in its option slot. The input detection part which is provided in the graphics board simply monitors the presence of and/or absence of an interruption request generated upon receipt of an input signal from the external input device, whereby no modification is required on the body of the computer. In other words, the "screen saver" function can be provided by merely modifying the graphics board, whereby it is possible to have the manufacturer of such a graphics board provide the "screen saver" function.

According to the present invention, the graphics board is selected as an option board for providing a "screen saver" function. The graphics board, which supplies a video signal to the CRT display unit and is connected to a line of an interface signal between a CPU and an input/output unit provided in the computer, is most suitable for detecting the absence of an input signal received from the external input device for a prescribed period of time and driving the "screen saver".

When the graphics board according to the present invention is employed, it is possible to drive a "screen saver" with no regard to an operating system or application software employed in the computer to display a homogeneous black picture image on the CRT, thereby enabling regular application of the aforementioned power supply control method for a CRT display unit according to the present invention. Thus, it is possible to widen the applicable range of this power supply control method.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
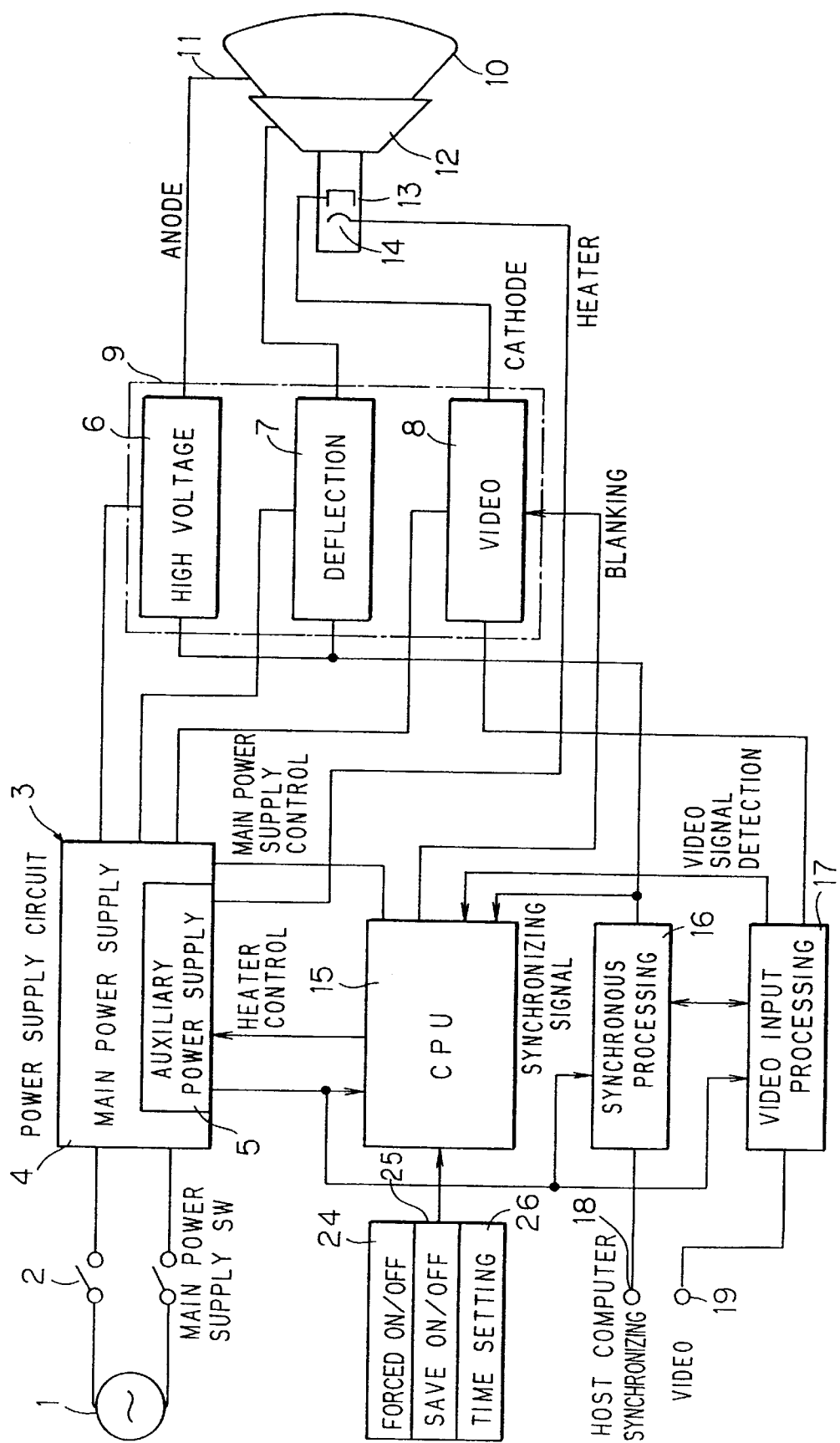
FIG. 1 is a block diagram showing an electrical structure provided in a CRT display unit according to an embodiment of the present invention.

FIG. 1 is a block diagram showing an electrical structure provided in a CRT display unit according to an embodiment of the present invention. This CRT display unit is connected to a central unit such as a host computer, for example, which generates a synchronizing signal and a video signal, to display an image of the video signal on the CRT display unit.

The CRT display unit includes a power supply circuit 3 which is connected to a commercial ac power supply 1 through a main power supply switch 2. This power supply circuit 3 includes a main power supply 4 and an auxiliary power supply 5.

The CRT display unit further includes a power circuit 9 including a high voltage circuit 6, a deflection circuit 7 and a video circuit 8, which are driven by the main power supply 4.

A CRT 10 includes an anode 11 which is supplied with a high dc voltage from the high voltage circuit 6, a deflection yoke 12 which is supplied with a deflecting current from the deflection circuit 7, a cathode 13 which is supplied with a cathode drive signal from the video circuit 8, and a heater 14 which is supplied with a current from the auxiliary power supply 5.

The CRT display unit further includes a CPU 15, a synchronous processing circuit 16 and a video input processing circuit 17, which are driven by the auxiliary power supply 5.

A synchronizing signal from the host computer (not shown) is supplied to the synchronous processing circuit 16 through a synchronizing signal input terminal 18, while a composite video signal superposed with such a synchronizing signal is supplied to the synchronous processing circuit 16 through a video signal input terminal 19. The synchronous processing circuit 16 performs processing such as waveform shaping, polarity decision and/or synchronization separation of the synchronizing signal or automatic switching of the composite video signal, so that the as-processed desired synchronizing signal is supplied to the high voltage circuit 6 and the deflection circuit 7, as well as, to the CPU 15.

A video signal from the host computer is supplied to the video input processing circuit 17 through the video signal input terminal 19. The video input processing circuit 17 performs processing such as amplification of the video signal, so that the as-processed video signal is supplied to the video circuit 8. The video input processing circuit 17 includes a video signal detector for detecting the presence and/or absence of the video signal from the host computer. This video signal detector is illustrated in FIG. 2 in detail.

Figure 2:
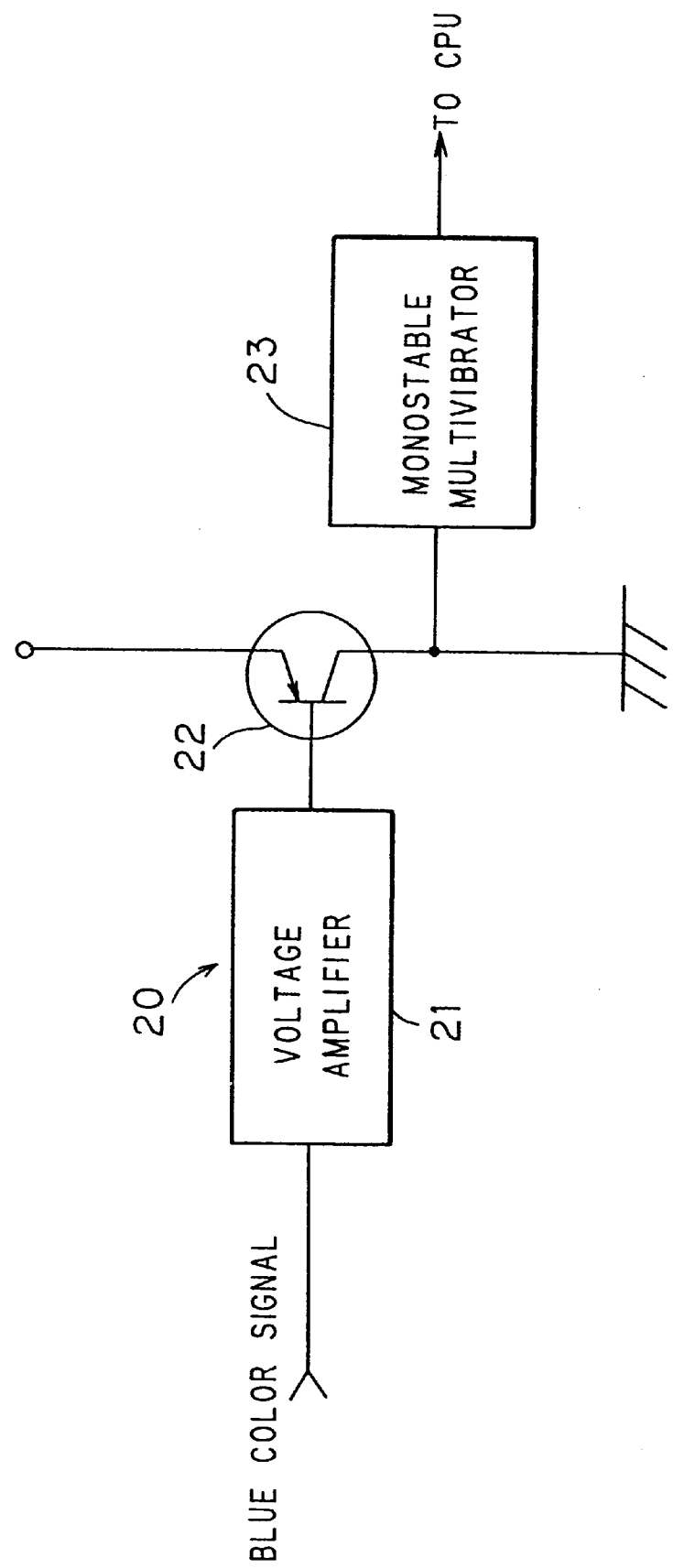
FIG. 2 is a block diagram showing a video signal detection circuit 20 included in a video input processing circuit 17 shown in FIG. 1.

As shown in FIG. 2, a video signal detection circuit 20 is adapted to detect the presence and/or absence of a blue color signal, so that an analog signal serving as a blue color signal is applied as an input to a voltage amplifier 21 to be amplified therein. An output of the voltage amplifier 21 is supplied to a base of a transistor 22. When the voltage supplied to the base is reduced below a prescribed value, the transistor 22 is switched that a prescribed voltage is applied as an input to a monostable multivibrator 23. The monostable multivibrator 23 generates a video signal detection signal having a pulse width of 38 msec. which exceeds a vertical scanning period. the video signal detection signal is supplied to the CPU 15.

Referring again to FIG. 1, the CPU 15 includes a main power supply controller which controls the main power supply 4 to turn on and turn off the power circuit 9 when the video signal detection circuit 20 detects one of the presence and/or absence of a blue color signal, a first timer which times an OFF state of the power circuit 9, and an auxiliary power supply controller which controls the auxiliary power supply 5 to turn off the heater 14 after a lapse of a period of time previously set in the first timer, as clearly described later with reference to a power supply control procedure. The main power supply controller includes a second timer for timing a state in which no video signal is supplied from the host computer, a power circuit turnoff device for turning off the power circuit 9 after a lapse of a period of time previously set in the second timer means, and blanking signal generator which supplies a picture blanking signal to the video circuit 8 for a prescribed period of time when the video signal detection circuit 20 detects presence of a video signal. The CPU 15 further includes a controller for controlling the power supply circuit 3 to turn off the power circuit 9 and the heater 14 after a lapse of a prescribed period of time upon detection of a state in which no synchronizing signal is supplied from the host computer.

In relation to the CPU 15, further provided are a forced on/off switch 24, a power save on/off switch 25 and a time setting switch 26. The forced on/off switch 24 supplies the CPU 15 with a signal for controlling the power supply circuit 3, in order to forcibly turn on or off the power circuit 9 and the heater 14 with no regard to a power supply control state of the CPU 15. The power save on/off switch 25 supplies the CPU 15 with a signal for switching the device between the so-called "power save mode" for turning off the power circuit 9 and the heater 14 according to a prescribed procedure upon operation of the aforementioned "screen saver" and another mode. The time setting switch 26 is driven so as to change the time which is set in the first timer. According to this embodiment, the first timer is adapted to restart timing when the video signal detection circuit 20 detects the absence of a video signal. A period of time of 63 minutes is previously set in the first timer, and this period of time can be varied in a range of 8 to 63 minutes through the time setting switch 26. On the other hand, a period of time of 3 minutes is previously set in the second timer, and this period of time is fixed. However, the period of time which is set in the second timer may also be rendered variable.

Figure 3:
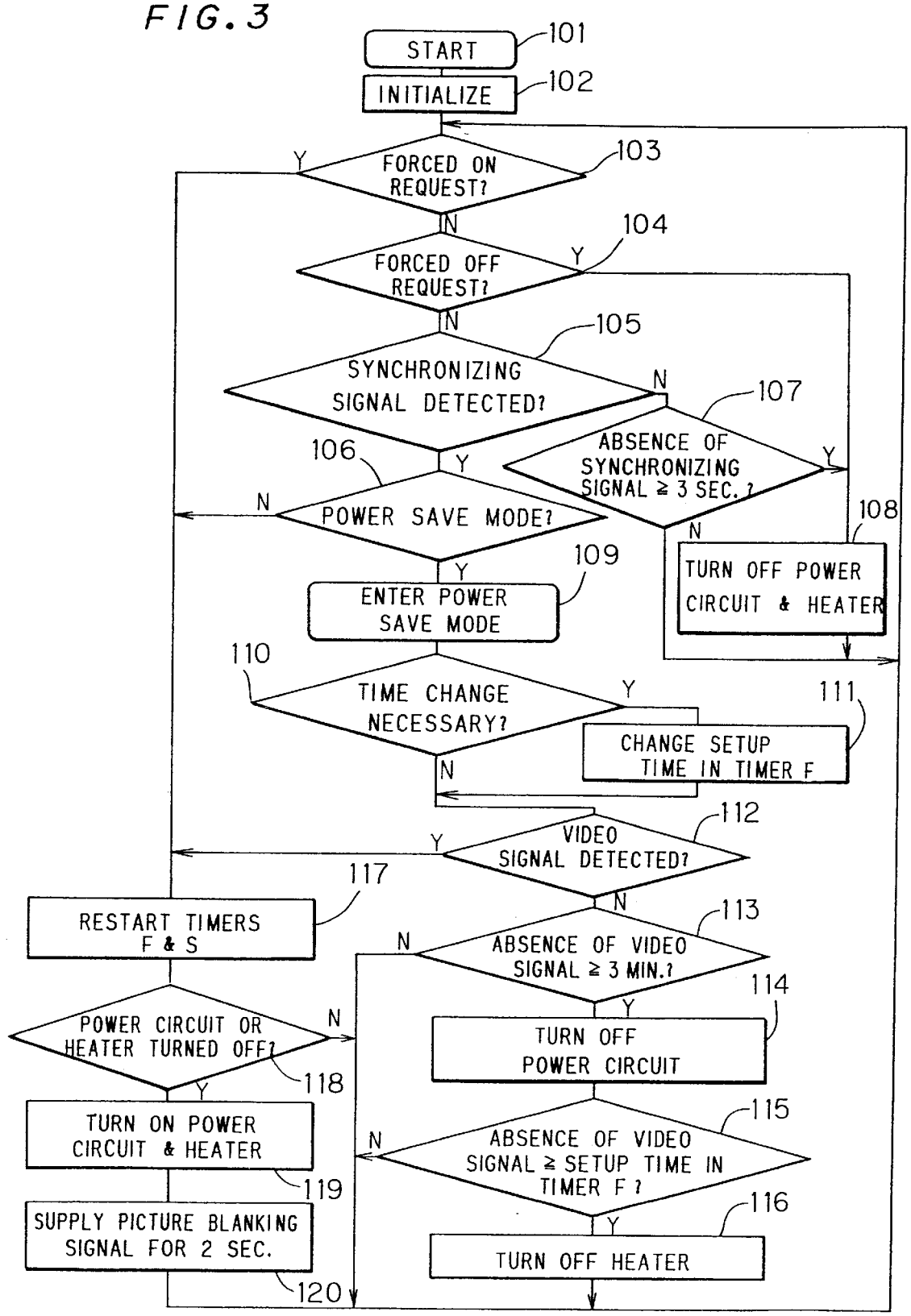
FIG. 3 is a flow chart showing a power supply control procedure executed by a CPU 15 shown in FIG. 1.
Figure 4:
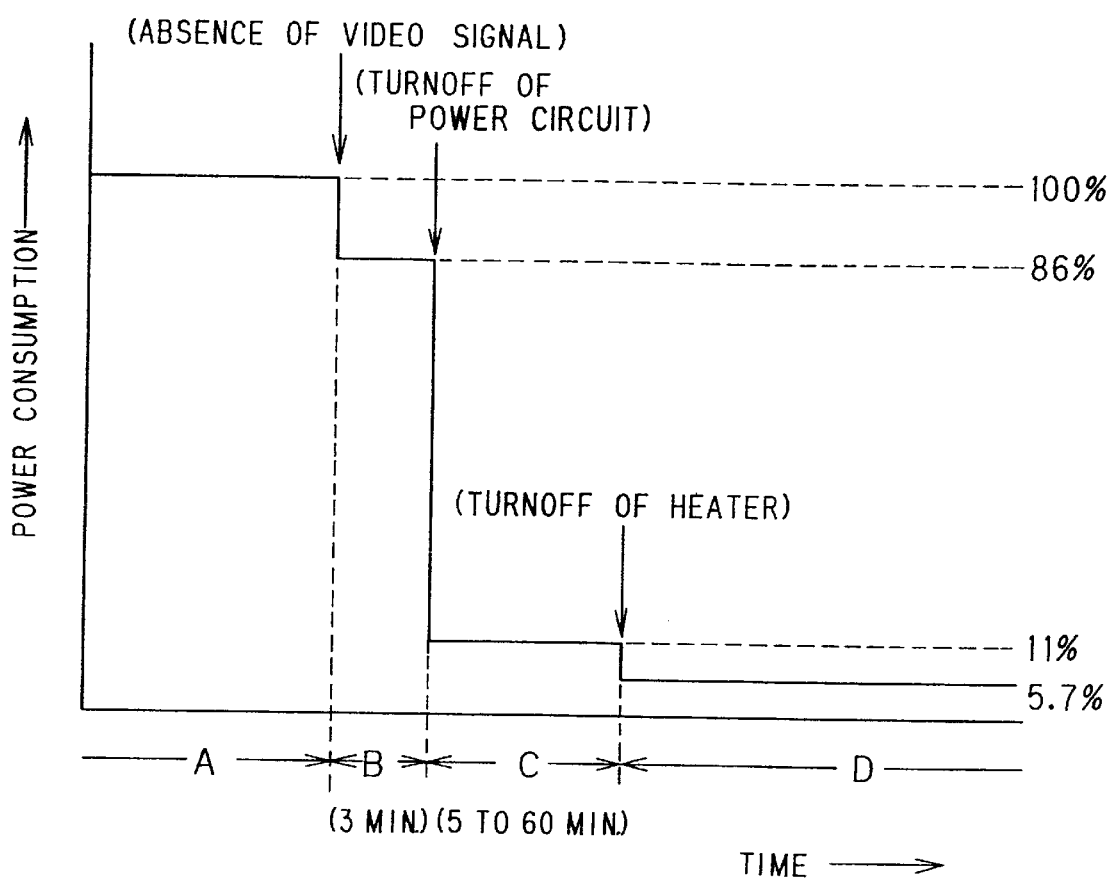
FIG. 4 illustrates typical state transitions implemented in a power save mode which is obtained from the power supply control procedure shown in FIG. 3 in relation to power consumption.

FIG. 3 is a flow chart showing a power supply control procedure which is executed by the CPU 15. FIG. 4 illustrates transition of some typical states implemented in a power save mode resulting from the power supply control procedure shown in FIG. 3 in relation to power consumption.

Mainly with reference to FIG. 3, the main power supply switch 2 (FIG. 1) is turned on at a step 101, to start the procedure shown in FIG. 3. Upon such operation of the main power supply switch 2, the auxiliary power supply 5 first rises as shown in FIG. 1, thereby driving the CPU 15, the synchronous processing circuit 16 and the video input processing circuit 17.

Then, initialization is carried out at a step 102 to set a period of time for 63 minutes in the first timer (shown as "timer F" in FIG. 3) and a period of time for 3 minutes in the second timer (shown as "timer S" in FIG. 3). The first and second timers start timing simultaneously with such setting.

Then, a determination is made at a step 103 as to whether the forced on/off switch 24 (FIG. 1) generates an ON request. If the determination is yes, the process is led to steps 117, 118, 119 and 120, so that the CPU 15 generates a main power supply control signal and a heater control signal at the step 119 for controlling the main power supply 4 and the auxiliary power supply 5 to turn on the power circuit 9 and the heater 14 respectively. Thus, the CRT 10 is operating to display an image.

If the determination at the step 103 is no, the process is led to a step 104, so that a determination is made as to whether the forced on/off switch 24 generates an OFF request. If the determination is yes, the process is led to a step 108, so that the main power supply 4 and the auxiliary power supply 5 are controlled to turn off the power circuit 9 and the heater 14.

If the determination at the step 104 is no, the process is led to a step 105, so that a determination is made as to whether a synchronizing signal is received from the host computer through the synchronizing signal input terminal 18. If the determination is no, a determination is made at a step 107 as to whether such a state in which no synchronizing signal is present continues for more than 3 seconds. If the determination is yes, the power circuit 9 and the heater 14 are turned off at a step 108. Such a state in which a synchronizing signal is absent for a period of time in excess of 3 seconds corresponds to an OFF state of a power supply for the host computer or a state of disconnection between the host computer and the CRT display unit. When the determination at the step 107 is no, the power circuit 9 and the heater 14 are not turned off and the process is returned to the step 103. Such a waiting time for 3 seconds is provided before turning off the power circuit 9 and the heater 14 in consideration of a possibility of mode switching in the host computer, so that the power circuit 9 and the heater 14 are not erroneously turned off by the absence of the synchronizing signal caused by such mode switching.

If a synchronizing signal is detected at the aforementioned step 105, on the other hand, the process is led to a step 106. At the step 106, a determination is made as to whether the device is switched to a power save mode by the power save on/off switch 25 shown in FIG. 1. If the determination is yes, the device enters a power save mode at a step 109.

When the device enters a power save mode, a determination is made at a step 110 as to whether it is necessary to change the setup time in the first timer (timer F), i.e., a period of time from turnoff of the power circuit 9 to turnoff of the heater 14. While the setup time of the timer F is variable within the range of 8 to 63 minutes from a state in which a video signal is absent (5 to 60 minutes from turnoff of the power circuit 9), this time is previously set at 63 minutes at the step 102. In order to set a shorter period of time, the operator can input data to shorten the time period, for example. Therefore, the determination at the step 110 is made as to whether such data is input. When it is necessary to change the setup time in the timer F, the time setting switch 26 shown in FIG. 1 is manipulated to change the time at a step 111. Simultaneously with such change of the setup time, the timer F restarts timing.

When the determination at the step 110 is no or the change of the setup time is finished at the step 111, the process is led to a step 112. At the step 112, a determination is made as to whether a video signal is transmitted from the host computer to the video signal input terminal 19 shown in FIG. 1 and a blue color signal, for example, is detected by the video signal detection circuit 20 (FIG. 2) included in the video input processing circuit 17. If the determination is yes, the process is led to the aforementioned step 117. If the determination is no, the process is led to a step 113.

At the step 113, it is determined whether a state in which a video signal is absent continues for a period of time in excess of 3 minutes, i.e., a setup time in the second timer (timer S). When the determination is yes, the power circuit 9 is turned off at a step 114. If the determination is no, the process is returned to the step 103. Such a waiting time for 3 seconds is provided before turning off the power circuit 9 so that the power circuit 9 is not erroneously turned off if application software intentionally displays a homogeneous black image or the like for a prescribed period of time.

Then, a determination is made at a step 115 as to whether the state in which no video signal is present is continuous in excess of the setup time in the timer F. If the determination is yes, the heater 14 is turned off at a step 116. Such a prescribed period of time is provided before turnoff of the heater 14 after the power circuit 9 is turned off so that image display can be quickly restored without having to wait for the heater 14 to heat up when the video signal is again detected (step 112) during this time.

At the aforementioned step 117, the first and second timers (timers F and S) are restarted. This step is carried out when a forced ON request is detected at the step 103, no power save mode is detected at the step 106, or the video signal is detected at the step 112.

After the timers F and S are restarted at the step 117, a determination is made at a step 118 as to whether the power circuit 9 or the heater 14 has been turned off. If this CRT display unit has been already used and the power circuit 9 and the heater 14 have been turned on, the process is returned to the step 103. If use of the CRT display unit is started, the power circuit 9 is turned off at the step 114 or the heater 14 is turned off at the step 116 following the power circuit 9, on the other hand, the process is led to a step 119 so that the power circuit 9 and the heater 14 are turned on. Thus, image display is started in the CRT 10.

When the image display is started at the step 119, a picture blanking signal is supplied to the video circuit 8 for 2 seconds at a step 120. This picture blanking signal is supplied to prevent display of an irregular image, which appears on the CRT 10 upon activation of the power circuit 9 at the step 119 after the video signal is detected at the step 112 when the power circuit 9 is in an OFF state but the heater 14 is in an ON state. When the high voltage circuit 6, the deflection circuit 7 and the video circuit 8 are simultaneously turned on, the high voltage circuit 6 and the deflection circuit 7 cause instable states in rising, such that an irregular image is displayed on the CRT 10 if a video signal is applied to the video circuit 8 in this stage. When a picture blanking signal is supplied for 2 seconds, for example, until the high voltage circuit 6 and the deflection circuit 7 are stabilized, therefore, the CRT 10 displays a homogeneous black picture image, to prevent the display of an irregular image on CRT 10. The video signal is applied to the video circuit 8 after a lapse of the 2 seconds, so that the CRT 10 displays an ordinary image.

The aforementioned power supply control procedure is now described in relation to transition of typical states in a power save mode shown in FIG. 4.

In a state A shown in FIG. 4, the CRT 10 displays an ordinary image. If the device is in a power save mode in this state, the procedure shown in FIG. 3 is executed along a loop beginning upon return of the process to the step 103 and continuing through the steps 104, 105, 106, 109, 110, 112, 117 and 118. When no power save mode is employed, on the other hand, the procedure shown in FIG. 3 is executed along a loop beginning upon returning of the process to the step 103 and continuing through the steps 104, 105, 106, 117 and 118.

When absence of the video signal from the host computer occurs in the aforementioned state A in employment of the power save mode, transition to a state B in FIG. 4 takes place. When the CRT 10 continuously displays the same image for a constant period of time in an operating state of the "screen saver", the video signal from the host computer is interrupted so that the CRT 10 displays a homogeneous black picture image in order to prevent burning of a fluorescent material provided therein, as hereinabove described. In response to such interruption of the video signal, transition from the state A to the state B takes place. In the state B, the procedure shown in FIG. 3 is executed along a loop beginning upon return of the process to the step 103 and continuing through the steps 104, 105, 106, 109, 110, 112 (or 111, 112) and 113.

When a period of time for 3 minutes elapses in the aforementioned state B, the power circuit 9 is turned off, whereby transition to a state C shown in FIG. 4 takes place. In the state C, the procedure shown in FIG. 3 is executed along a loop beginning upon return of the process to the step 103 and continuing through the steps 104, 105, 106, 109, 110, 112, 113, 114 and 115.

When the prescribed period of time which is set in the first timer means (timer F), i.e., 8 to 63 minutes from interruption of the video signal (5 to 60 minutes from transition from the state B to the state C) elapses in the state C, the heater 14 is turned off, whereby transition to a state D takes place. In the state D, the procedure shown in FIG. 3 is executed along a loop beginning upon return of the process to the step 103 and continuing through the steps 104, 105, 106, 109, 110, 112, 113, 114, 115 and 116.

The process passes through the step 112 in every one of the states B, C and D, while the process is led from the step 112 to the step 117 when a video signal is again supplied from the host computer in each state. Thereafter a determination of no is made at the step 118 following the step 117 in the state B since both of the power circuit 9 and the heater 14 are in ON states, so that the process is returned to the step 103 for restoration to a state of producing an ordinary image display in the CRT 10, i.e., the state A. In the state C or D, on the other hand, a determination of yes is made at the step 118 following the step 117, so that the process is returned to the step 103 through the steps 119 and 120. Consequently, the device is restored to a state of providing an ordinary image display in the CRT 10, i.e., the state A.

From the state B, the device is instantaneously restored to the state A. From the state C, on the other hand, the device is restored to the state A after a lapse of 2 seconds because of the picture blanking signal which is supplied for 2 seconds at the step 120. When the device is restored from the state D to the state A, further, a recovery time of 10 to 15 seconds is required since it is necessary to raise up the temperature of the heater 14.

FIG. 4 shows exemplary levels of power consumed by the CRT display device in the states A, B, C and D respectively. Assuming that power of 100% is consumed in the state A, power of 86%, power of 11% and power of 5.7% are consumed in the states B, C and D respectively. However, such definite percentages are mere examples. Power which is consumed in the state A is varied with the content of the image displayed on the CRT 10, as well as with the dimensions of the CRT 10.

While the present invention has been described with reference to a preferred embodiment, the following modifications are also available in the power control method according to the present invention:

As to the state transition shown in FIG. 4, the state B may be omitted so that the power supply is controlled to cause transition from the state A to the states C and D. In this case, the step 113 shown in FIG. 3 is omitted.

Referring to FIG. 4, further, the state C may be omitted so that the power supply is controlled to cause transition to the state D through the states A and B. In this case, the steps 110, 111 and 115 are omitted from FIG. 3.

In the power supply control procedure shown in FIG. 3, the first timer (timer F) is adapted to start timing from a point when a video signal is absent at the step 115, in order to obtain timing for controlling the heater 14 at the step 116. However, this timer may be replaced by a timer which is adapted to start timing from a point when the power circuit 9 is turned off, in order to obtain timing for controlling the heater 15. Such a control procedure is now described with reference to FIG. 5.

Figure 5:
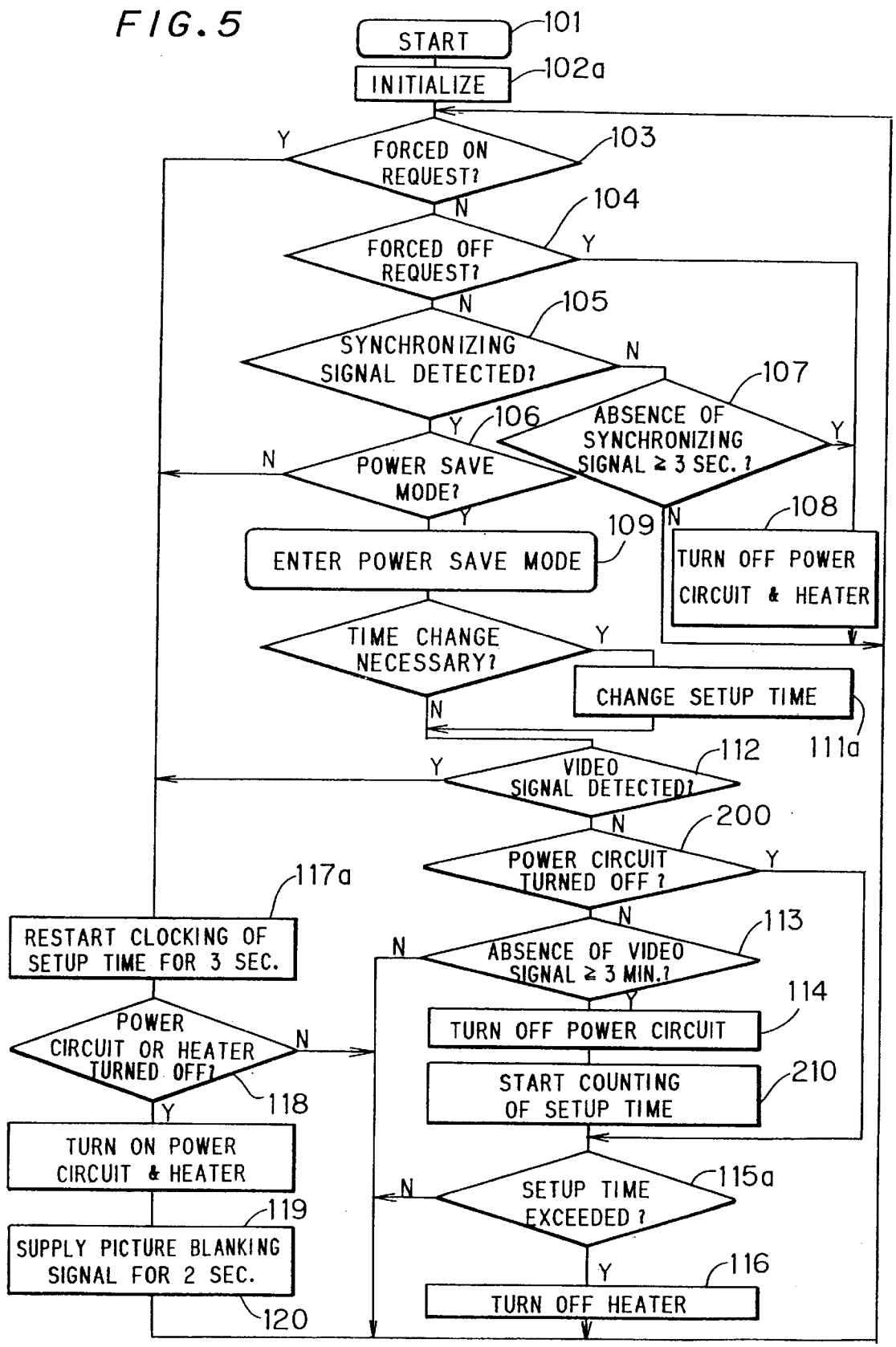
FIG. 5 is a flow chart corresponding to FIG. 3, showing a power supply control procedure executed in another embodiment of the present invention.

FIG. 5 is a flow chart showing a power control procedure executed in another embodiment of the present invention. Referring to FIG. 5, steps corresponding to those shown in FIG. 3 are denoted by similar reference numerals, to omit redundant description.

In the control procedure shown in FIG. 5, a single timer is employed to provide timing for controlling the turning off of the power circuit 9 and that for controlling the turning off of the heater 14. Namely, a setup time for 3 minutes for controlling the turning off of the power circuit 9 is first set in this timer, which in turn starts timing. After completion of such timing for 3 minutes, a setup time for 5 to 60 minutes is set in this timer, which in turn starts timing. At a step 102a shown in FIG. 5, the setup time for 3 minutes is set in this timer, which simultaneously starts clocking. Further, the CPU 15 stores a setup time for 60 minutes to be subsequently set in the timer.

When a determination is made at a step 110 shown in FIG. 5 that it is necessary to change a period of time from turnoff of the power circuit 9 to that of the heater 14, this period of time is changed at a step 111a within a range of 5 to 60 minutes, so that the as-changed period of time is stored in the CPU 15.

When no video signal is detected at a step 112, the process is led to a step 200. At the step 200, a determination is made as to whether or not the power circuit 9 is turned off. If the determination is no, a determination is made at a step 113 as to whether a state in which a video signal is absent continues for a period of time in excess of 3 minutes. If the determination is yes, the power circuit 9 is turned off at a step 114.

Then, data related to the period of time within the range of 5 to 60, which is stored in the CPU 15, is set at a step 210, so that the timer starts timing. Then, a determination is made at a step 115a as to whether or not the setup time of 5 to 60 minutes elapses from turnoff of the power circuit 9. If the power circuit 9 is continuously in an OFF state in excess of the setup time, the heater 14 is turned off at a step 116, similarly to the aforementioned embodiment.

If the determination is yes at the step 200, the process is directly led to the step 115a. If the determinations are no at the steps 113 and 115a respectively, the process is returned to a step 103.

When a video signal is detected at the step 112, on the other hand, the process is led to a step 117a. At this step 117a, the timer is set at 3 minutes, to restart timing along the setup time of 3 minutes.

The remaining part of the control procedure shown in FIG. 5 is substantially similar to that shown in FIG. 3.

As hereinabove described, the operation for controlling the power supply for the CRT display unit is started by display of a homogeneous black picture image on the CRT 10 according to the present invention. When the computer employs an operating system or application software in which no homogeneous black picture image is displayed but proper animation display is carried out on the CRT upon operation of the "screen saver", therefore, it is impossible to apply the inventive power supply control.

According to the following embodiment, however, it is possible to drive the "screen saver" regardless of the operating system or application software employed in the computer, as well as to display a homogeneous black picture image on the CRT at this time, whereby the inventive power supply control method can be regularly applied. Thus, it is possible to widen the available range of the power supply control method.

Figure 6:
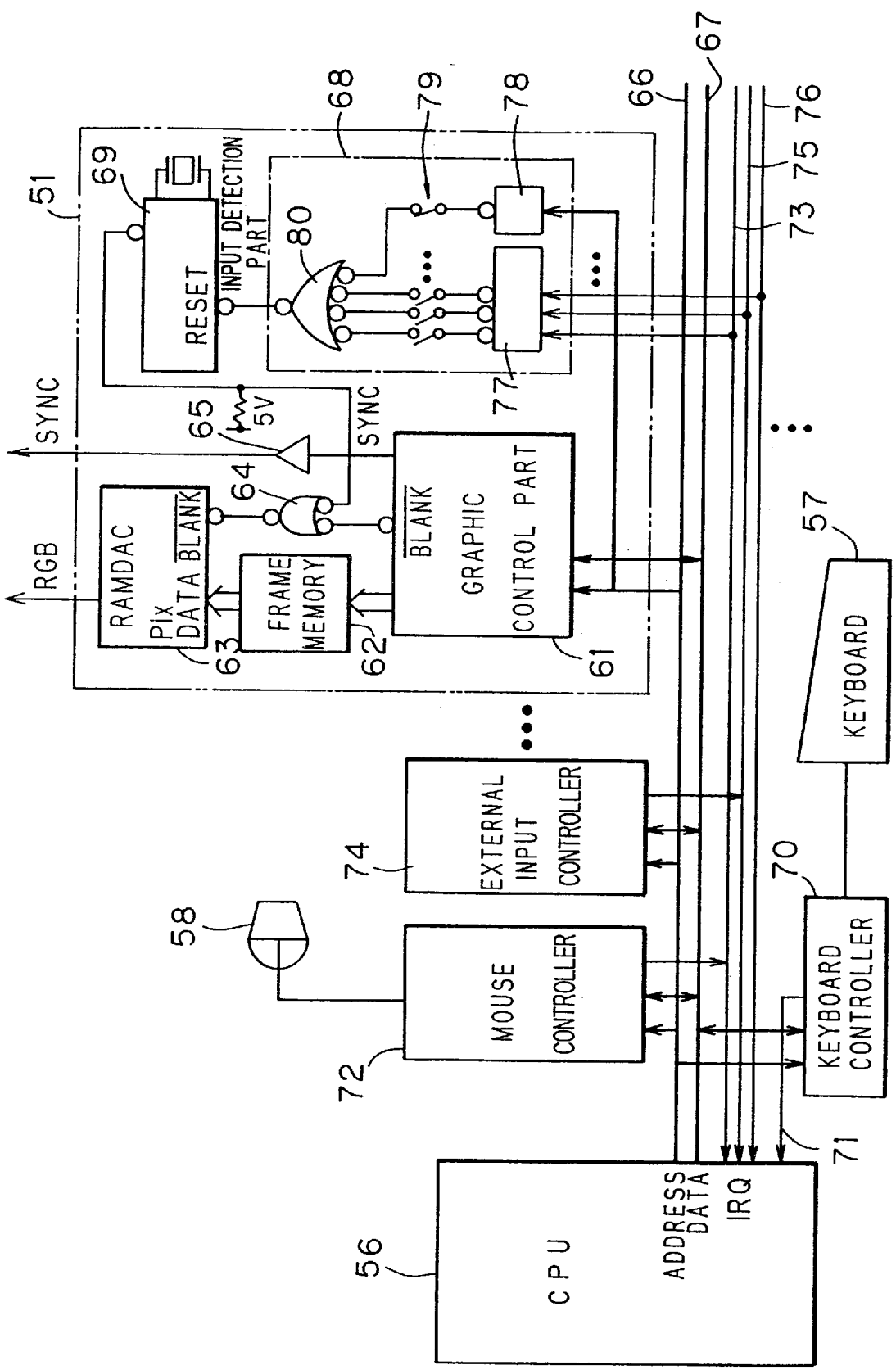
FIG. 6 is a block diagram showing a graphics board 51 included in another embodiment of the present invention and electrical elements on a computer related thereto.
Figure 7:
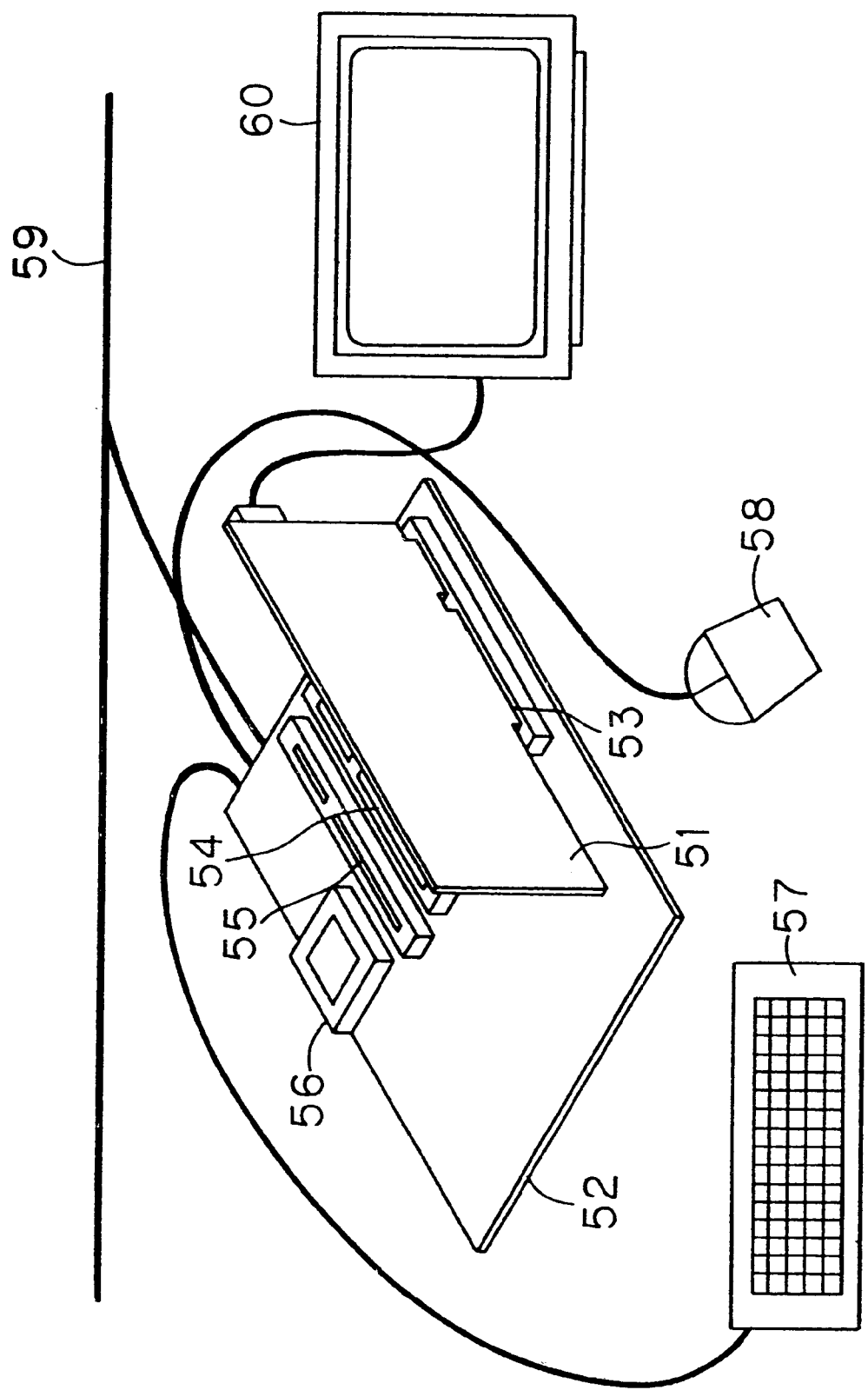
FIG. 7 schematically illustrates a mother board 52 provided in a computer body holding the graphics board 51 shown in FIG. 6 and some external input/output units.

FIG. 6 is a block diagram showing a graphics board 51 according to another embodiment of the present invention and electrical elements which are included in a computer related thereto. FIG. 7 schematically illustrates a mother board 52 provided in the body of the computer holding the graphics board 51 shown in FIG. 6 and some external input/output units.

Referring to FIG. 7, the mother board 52 which is provided with some option slots 53, 54, 55, is arranged in the body of a computer of an open architecture type. The graphics board 51 is inserted in an arbitrary slot, such as the option slot 53, for example, selected from the option slots 53, 54, 55. The mother board 52 further carries a CPU 56 thereon.

The mother board 52 is connected with a keyboard 57 serving as an external input device. The mother board 52 is further connected with a mouse 58 and a network 59, serving as other external input device, as needed. The graphics board 51 is connected with a CRT display unit 60.

Some buses (not shown in FIG. 7) extend in relation to the option slots 53, 54, 55, so that an option board such as the graphics board 51 is connected to these buses in common whichever option slot receives this option board.

FIG. 6 shows elements corresponding to some of those shown in FIG. 7 with similar reference numerals. Referring to FIG. 6, the graphics board 51 comprises a graphic control part 61. This graphic control part 61 supplies an image signal to a frame memory 62, so that pixel data for one screen which is stored in the frame memory 62 is input in a pixel data terminal of a D-A converter (RAMDAC) 63. On the other hand, a blank signal from the graphic control part 61 is applied to a blank terminal of the D-A converter 63 through a gate 64. Thus, the D-A converter 63 generates a video signal which is supplied to the CRT display unit 60 (FIG. 7). Further, a synchronizing signal which is supplied as an output from the graphic control part 61 is supplied to the CRT display unit 60 through a buffer 65. The graphic control part 61 is connected with an address bus 66 and a data bus 67 extending from the CPU 56.

The aforementioned structure which is related to the graphics board 51 is substantially similar to that provided in a conventional graphics board.

According to this embodiment, the graphics board 51 further includes an input detection part 68 and a timer 69. The input detection part 68 is adapted to monitor the presence and/or absence of an interruption request which is generated upon receipt of an input signal from external input device such as the keyboard 57 or the mouse 58, thereby detecting the presence of the input signal from the external input device. This input detection part 68 is now described in detail.

Data from the keyboard 57 is received by a keyboard controller 70, which in turn writes the data in an output buffer (not shown) and presents an interruption request to the CPU 56 through an interruption signal line 71. The keyboard controller 70 is also connected with the address bus 66 and the data bus 67, respectively.

Further, data from the mouse 58 is received by a mouse controller 72, which in turn presents an interruption request to the CPU 56 through an interruption signal line 73. The mouse controller 72 is also connected with the address bus 66 and the data bus 67, respectively.

Similarly, an external input controller 74 is provided for receiving data, i.e., an input signal from the external input device such as a network, a facsimile, a digitizer or a track ball, to present an interruption request to the CPU 56 through an interruption signal line 75 upon receiving of the input signal. The external input controller 74 is also connected to the address bus 66 and the data bus 67, respectively. External input controllers corresponding to such an external input controller 74 are provided in correspondence to the number of external input devices employed, so that interruption requests from the external input controllers as added are supplied to the CPU 56 through other interruption signal lines such as lines 76.

In order to monitor the presence and/or absence of the aforementioned interruption request, the input detection part 68 of the graphics board 51 includes an interruption request detection part 77 and a keyboard access detection part 78. The interruption request detection part 77 is connected to the interruption signal lines 73, 75, 76, to monitor the presence and/or absence of an interruption request which is presented by the mouse controller 72, the external input controller 74 or the like to the CPU 56.

The aforementioned interruption signal lines 73, 75, 76 extend along the address bus 66 and the data bus 67, whereby the graphics board 51 can be easily connected with the interruption signal lines 73, 75, 76 when the same is inserted in the option slot 53, for example. However, the interruption signal line 71 from the keyboard controller 70 is generally directly introduced into the CPU 56, without extending along the address bus 66 and the data bus 67. Therefore, it is impossible to directly monitor an interruption request on the interruption signal line 71, in order to detect manipulation of the keyboard 57. To this end, the keyboard access detection part 78 is provided independently of the interruption request detection part 77 in order to detect manipulation of the keyboard 57, thereby detecting an address signal which is supplied as an output to the address bus 66 in response to manipulation of the keyboard 57. When the keyboard 57 is manipulated and an interruption request is supplied from the keyboard controller 70 to the CPU 56 through the interruption signal line 71, the CPU 56 determines such manipulation of the keyboard 57 to output an address signal onto the address bus 66.

Each of signals from the interruption request detection part 77 and the keyboard access detection part 78 is supplied to a gate 80 through switching member 79, so that an output signal from the gate 80 is applied to a reset terminal of the timer 69. The aforementioned switching member 79 is driven to select the external input device that is generating the signal whose presence is to be detected, so that it is possible to monitor only manipulation of the keyboard 57, only manipulation of the keyboard 57 or the mouse 58, or supply of an input signal from any one of the external input devices to the CPU 56, for example, by driving the switching member 79. The switching member 79 is generally driven previously by a manufacturer of the graphics board 51, or in an initial stage of use of the graphics board 51.

The timer 69 starts a timing operation upon input of a signal from the gate 80, i.e., upon detection of the presence of an input signal from any one of the external input devices including the keyboard 57 and the mouse 58. More specifically, the timer 69 is adapted to set a prescribed timer value which is decreased with a lapse of time, and is reset when the timer 69 receives a signal in the aforementioned reset terminal. When the input detection part 68 detects the absence of an input signal from the external input device again before a lapse of a period of time previously set in the timer 69, an output signal is output. This output signal is supplied to the aforementioned gate 64 to supply a blank signal from the D-A converter 63 to the CRT display unit 60 (FIG. 7). Thus, a CRT provided in the CRT display unit 60 displays a homogeneous black picture image, to attain a state of operation of a "screen saver".

If the input detection part 68 detects the presence of an input signal from the external input device before a lapse of the period of time previously set in the timer 69 or in an operating state of the "screen saver", the timer 69 is reset to restart a timing operation. At the same time, the CRT display unit 60 is restored to an ordinary image display state.

The period of time previously set in the timer 69 is preferably rendered variable in response to a request by the operator. When a nonvolatile memory storing the period of time set in the timer 69 is provided on the graphics board 51, it is possible to drive a desired "screen saver" without setting the timer 69 when the power supply for the computer is turned off and thereafter again turned on to start the computer.

Although the present invention has been described and illustrated in detail, it is clearly understood that the same is by way of illustration and example only and is not to be taken by way of limitation, the scope of the present invention being limited only by the terms of the appended claims.

What is claimed is:

1. A CRT display unit adapted to be connected to a central unit which generates a synchronizing signal and a video signal for displaying an image of said video signal on the CRT display unit, said CRT display unit comprising:
    a) a power supply circuit including:
        1) a main power supply; and
        2) an auxiliary power supply;
    b) a power circuit driven by said main power supply independently of said auxiliary supply, said power circuit including:
        1) a high voltage circuit;
        2) a deflection circuit; and
        3) a video circuit;
    c) a synchronous processing circuit for processing said synchronizing signal output from said central unit and supplying a processed synchronizing signal to said high voltage circuit and said deflection circuit;
    d) a video input processing circuit including:
        1) a video signal detector for detecting at least one of the presence and absence of said video signal output from said central unit, for processing said video signal and supplying a processed video signal to said video circuit;
    e) a CRT including:
        1) an anode being supplied with a high dc voltage from said high voltage circuit;
        2) a deflection yoke being supplied with a deflecting current from said deflection circuit;
        3) a cathode being supplied with a cathode drive signal from said video circuit; and
        4) a heater being supplied with a current from said auxiliary power supply independently of said main power supply;
    f) a main power supply controller for controlling said main power supply to turn on and turn off said power circuit upon detection of the presence and absence, respectively, of said processed video signal output by said video signal detector;
    g) a first timer for timing at least a predetermined period of time starting when a turn off operation of said power circuit is executed by said main power supply controller and continuing timing until said predetermined period of time has elapsed; and
    h) an auxiliary power supply controller for controlling said auxiliary power supply to turn off said heater after a lapse of said predetermined period of time which is previously set in said first timer.

2. A CRT display unit in accordance with claim 1, wherein said main power supply controller comprises a second timer for timing a state in which said video signal is absent, and a power circuit turnoff switch for turning off said power circuit after a lapse of a period of time which is previously set in said second timer.

3. A CRT display unit in accordance with claim 1, wherein said period of time previously set in said first timer is variable.

4. A CRT display unit in accordance with claim 1, wherein said main power supply controller comprises a blanking signal generator for supplying a picture blanking signal to said video circuit for a predetermined period of time when said video signal detector detects the presence of said video signal.

5. A CRT display unit in accordance with claim 1, further comprising a power supply controller for controlling said power supply circuit to turn off said power circuit and said heater after a lapse of a predetermined period of time upon detection of the absence of said synchronizing signal output from said central unit.

6. A CRT display unit in accordance with claim 1, wherein said video signal includes colors of red, green and blue, said video signal detector detects at least one of the presence and absence of at least one of said red color signal and blue color signal.

7. A CRT display unit in accordance with claim 1, further comprising:
    i) an extension graphics board to be inserted in an option slot provided in the central unit which is of an open architecture type, the central unit having a circuit for supplying said video signal to said CRT display unit for displaying an image based on an input signal input from an external input, said extension graphics board including:
        1) an input detection part for detecting at least one of the presence and absence of an interruption request which is generated upon receipt of said input signal and detecting at least one of the presence or absence of said input signal output from said external input;
        2) a second timer for starting a timing operation when said input detection part detects the presence of said input signal; and
        3) a blank signal generator for supplying a blank signal to said CRT display unit as said video signal upon no re-detection of the presence of said input signal by said input detection part before a lapse of a period of time previously set in said second timer.

8. A CRT display unit in accordance with claim 7, wherein said external input includes a keyboards, said input detection part includes an address signal detector for detecting an address signal supplied to an address bus in response to a manipulation of said keyboard.

9. A CRT display unit in accordance with claim 7, wherein said external input includes a mouser, said input detection part includes an interruption signal detector for detecting an interruption signal supplied as an output in response to a manipulation of said mouse.

10. A CRT display unit in accordance with claim 7, further comprising a plurality of external inputs, wherein said second timer starts a timing operation when said input detection part detects the presence of an input signal input from any one of said plurality of external inputs.

11. A CRT display unit in accordance with claim 10, wherein said input detection part comprises a selector for selecting the one of said external inputs that is generating a signal whose presence is to be detected.

12. A CRT display unit adapted to be connected to a central unit which generates a synchronizing a signal and a video signal for displaying an image of said video signal on the CRT display unit, said CRT display unit comprising:
    a) a power supply circuit including:
        1) a main power supply;
        2) an auxiliary power supply;
    b) a power circuit driven by said main power supply independently of said auxiliary power supply, the power circuit including:

1) a high voltage circuit;
2) a deflection circuit; and
3) a video circuit;
c) a synchronous processing circuit for processing said synchronous signal output from said central unit and supplying a processed synchronous signal to said high voltage circuit and said deflection circuit;
d) a video input processing circuit including:
1) a video signal detector for detecting at least one of the presence and absence of said video signal output from said central unit for processing said video signal and supplying a processed video signal to said video circuit;
e) a CRT including:
1) an anode being supplied with a high dc voltage from said high voltage circuit;
2) a deflection yoke being supplied with a deflecting current from said deflection circuit;
3) a cathode being supplied with a cathode drive signal from said video circuit; and
4) a heater being supplied with a current from said auxiliary power supply independently of said main power supply;
f) a main power supply controller for controlling said main power supply to turn on and turn off said power circuit upon detection of the presence and absence, respectively, of said processed video signal output by said video signal detector;
g) a first timer for starting a timing operation upon the detection of absence of said processed video signal output by said video signal detector and continuing after a turn off operation of said power circuit is executed by said main power supply controller and continuing timing until said predetermined period of time has elapsed; and
h) an auxiliary power supply controller for controlling said auxiliary power supply to turn off said heater after a lapse of said predetermined period of time which is previously set in said first timer.

13. A CRT display unit in accordance with claim 12, further comprising a power supply controller for controlling said power supply circuit to turn off said power circuit and said heater after a lapse of a predetermined period of time upon detection of the absence of said synchronizing signal from said central unit.

14. A CRT display unit in accordance with claim 12, wherein said video signal includes at least one of the colors of red, green and blue, said video signal detector detecting at least one of the presence and absence of at least one of said red color signal and said blue color signal.

15. A CRT display unit in accordance with claim 12, further comprising:
h) an extension graphics board adapted to be inserted in an option slot provided in the central unit which is of an open architecture type, the central unit having a circuit for supplying said video signal to said CRT display unit for displaying an image based on an input signal input from an external input, said extension graphics board including:
1) an input detection part for detecting at least one of the presence and absence of an interruption request which is generated upon receipt of said input signal and detecting at least one of the presence or absence of said input signal output from said external input;
2) a second timer for starting a timing operation upon said input detection part detecting the presence of said input signal by said input detection part; and
3) a blank signal generator for supplying a blank signal to said CRT display unit as said video signal upon no re-detection of the presence of said input signal by said input detection part before a lapse of a period of time previously set in said second timer.

16. A CRT display unit in accordance with claim 15, wherein said input includes a keyboards, said input detection part includes an address signal detector for detecting an address signal supplied to an address bus in response to a manipulation of said keyboard.

17. A CRT display unit in accordance with claim 15, wherein said external input includes a mouse, said input detection part includes an interruption signal detector for detecting an interruption signal supplied as an output in response to a manipulation of said mouse.

18. A CRT display unit in accordance with claim 15, further comprising a plurality of external inputs, wherein said second timer starts a timing operation when said input detection part detects the presence of an input signal input from any one of said plurality of external inputs.

19. A CRT display unit in accordance with claim 18, wherein said input detection part comprises a selector for selecting the one of said plurality of external inputs that is generating a signal whose presence is to be detected.

20. A power supply control method for a CRT display unit which is adapted to be connected to a central unit, the central unit generating a video signal for displaying an image of said video signal on the CRT display unit, said CRT display unit comprising a CRT including an anode, a deflection yoke, a cathode and a heater, a power circuit including a high voltage circuit for applying a high dc voltage to said anode, a deflection circuit for supplying a deflection current to said deflection yoke and a video circuit for supplying a cathode drive signal to said cathode, and a power supply circuit including a main power supply providing a power supply for driving said power circuit and an auxiliary power supply for supplying a current to said heater independently of said main power supply, said power supply control method comprising the steps of:
controlling said main power supply to turn off said power circuit in response to an absence of said video signal; and
controlling said auxiliary power supply to turn off said heater after a lapse of a predetermined period of time in which said power circuit is in an OFF state as a result of said power circuit being turned off in response to said absence of said video signal in said step of controlling said main power supply, said predetermined period of time beginning upon the detection of the absence of said video signal and continuing after said power circuit is turned off until said predetermined period of time has elapsed.

21. A power supply control method in accordance with claim 20, wherein said step of controlling said main power supply to turn off said power circuit comprises a step of maintaining said power circuit in an ON state until the lapse of a predetermined period of time in which said video signal is absent, and a step of turning off said power circuit after a lapse of said predetermined period of time.

22. A power supply control method in accordance with claim 20, wherein a period of time from turnoff of said power circuit to turnoff of said heater is variable.

23. A power supply control method for a CRT display unit adapted to be connected to a central unit which generates a video signal for displaying an image of said video signal, said CRT display unit comprising a CRT including an anode, a deflection yoke, a cathode and a heater, a power circuit including a high voltage circuit for applying a high dc voltage to said anode, a deflection circuit for supplying a deflecting current to said deflection yoke and a video circuit for supplying a cathode drive signal to said cathode, and a power supply for driving said power circuit and an auxiliary power supply to supplying a current to said heater independently of said main power supply, said power supply control method comprising the step of:

controlling said main power supply to turn off said power circuit in response to an absence of said video signal;

controlling said auxiliary power supply to turn off said heater after a lapse of a predetermined period of time in which said video signal is absent, said predetermined period of time beginning when said power circuit has been turned off until said predetermined period of time has elapsed.

24. A CRT display unit receiving a video signal and a synchronizing signal from a computer, the CRT display unit comprising:

a detection circuit for detecting a condition of the signals; and a power supply control circuit coupled to the detection circuit and operating said CRT display unit at least two stages of power saving in response to the condition detected by the detection circuit, wherein a first power consumption in a first power save stage which occurs first is larger than a second power consumption in a second power save stage which occurs later.

25. A CRT display unit receiving a video signal and a synchronizing signal from a computer, the CRT display unit comprising:

a detecting circuit for detecting absence of a signal on each of at least two signal lines connected to the computer; and a power supply control circuit coupled to the detection circuit and supplying a power supply voltage of a first power level and a power supply voltage of a second power level different from the first power level in response to the detection by the detection circuit.

* * * * *